(12) United States Patent
Oberski et al.

(10) Patent No.: US 9,303,097 B2
(45) Date of Patent: Apr. 5, 2016

(54) METHOD AND COMPOSITION FOR INK JET PRINTING ON A NONABSORBENT SUBSTRATE

(75) Inventors: Michael Vincent Oberski, Ann Arbor, MI (US); Paul Andrew Edwards, Saline, MI (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 1034 days.

(21) Appl. No.: 13/414,444

(22) Filed: Mar. 7, 2012

(65) Prior Publication Data

US 2012/0162337 A1 Jun. 28, 2012

Related U.S. Application Data

(62) Division of application No. 12/398,900, filed on Mar. 5, 2009, now Pat. No. 8,133,539.

(60) Provisional application No. 61/034,382, filed on Mar. 6, 2008.

(51) Int. Cl.
*B41J 2/01* (2006.01)
*C08F 2/48* (2006.01)
*B41M 5/00* (2006.01)
*B41M 7/00* (2006.01)

(52) U.S. Cl.
CPC ............... *C08F 2/48* (2013.01); *B41M 5/0011* (2013.01); *B41M 5/0017* (2013.01); *B41M 5/0047* (2013.01); *B41M 7/0081* (2013.01); *B41M 7/0045* (2013.01); *B41M 7/0054* (2013.01)

(58) Field of Classification Search
CPC ............ B41M 5/0047; B41M 7/0054; B41M 7/0045; B41M 5/0017; B41M 5/0011; B41M 7/0081

See application file for complete search history.

(56) References Cited

U.S. PATENT DOCUMENTS

| | | | |
|---|---|---|---|
| 6,014,919 | A | 1/2000 | Jacobsen et al. |
| 6,034,166 | A | 3/2000 | Jackson et al. |
| 6,720,042 | B2 | 4/2004 | Ylitalo et al. |
| 2004/0028825 | A1 | 2/2004 | Manes |
| 2007/0131099 | A1 | 6/2007 | Nishida et al. |

*Primary Examiner* — Xiao Zhao
(74) *Attorney, Agent, or Firm* — Michael A. Glenn; Perkins Coie LLP

(57) ABSTRACT

Ink jet printing on a non-absorbent substrate involves a wet primer having a primer viscosity. The wet primer is applied on the non-absorbent substrate. An ink jet ink having an ink jet viscosity lower than the primer viscosity is jetted over the wet primer while the primer is still wet. The wet primer and ink are simultaneously cured on the substrate.

9 Claims, No Drawings

METHOD AND COMPOSITION FOR INK JET PRINTING ON A NONABSORBENT SUBSTRATE

CROSS REFERENCE TO RELATED APPLICATIONS

This application is a divisional application of U.S. patent application Ser. No. 12/398,900, filed Mar. 5, 2009 now U.S. Pat. No. 8,133,539, which is hereby incorporated herein in its entirety.

U.S. patent application Ser. No. 12/398,900 claims benefit of U.S. provisional patent application Ser. No. 61/034,382, filed Mar. 6, 2008, which is also incorporated herein in its entirety by this reference thereto.

BACKGROUND OF THE INVENTION

1. Technical Field

The invention relates to ink jet printing. More particularly, the invention relates to preparing inkjet substrates.

2. Discussion of the Background Art

Modern ink jet printing techniques are useful for printing on a variety of substrates. Ink jet printing allows application of ink to discrete locations by jetting drops of ink on the substrate. Ink jet printing efficiently provides a high degree of printing control with almost effortless and endless color control and selection. The combination of these attributes makes ink jet printing an attractive substitute for traditional impact processes, such as lithograph and flexographic printing, which have been used in the past.

The differences in interaction of the ink and the substrate that occur with ink jet printing may not allow for a simple and direct transition from a traditional printing techniques, such as flexography or lithograph techniques, to an ink jet process, particularly with regard to printing on non-absorbent substrates. A direct transition using current methods results in inferior ink lay, poor print quality, and excessive mobility of the ink jet ink that can cause such defects as cratering or pinholing. Attempts to adapt ink jet methods without sacrificing ink lay and print quality have led to the production of various basecoat formulas or ink chemistry modifications which only marginally improve the final product. Current modifications of ink jet printing techniques are inadequate because of a lack of parameters that insure appropriate ink jet application. Additionally, current modifications of ink jet printing techniques fail to mask any surface features on an underlying substrate, thereby amplifying the appearance of pinholes, craters, and other surface defects.

Accordingly, there is a need for improved ink jet printing methods and detailed parameters to optimize the ink jet printing methods with a variety of substrates.

SUMMARY OF THE INVENTION

An embodiment of the invention provides techniques for ink jet printing on a nonabsorbent substrate. One embodiment of the invention comprises applying a wet primer having a primer viscosity onto the non-absorbent substrate; ink jet printing an ink jet ink having an ink jet viscosity lower than the primer viscosity over the wet primer while the primer is still wet; and simultaneously curing the wet primer and ink on the substrate. In various embodiments, techniques of immobilizing an ink jet ink on a non-absorbent substrate comprise applying an even layer of a primer by a flexographic process onto the non-absorbent substrate; jetting the ink over the even primer layer while the primer is still wet; maintaining the system at a constant temperature above 20 degrees C.; and simultaneously curing the wet primer and the ink on the substrate. Inventive techniques include those of ink jet printing onto a metallic substrate that comprises applying a primer having a primer viscosity of from about 100 to about 300 centipoises onto the metallic substrate, such that the primer coated surface has a surface energy of from about 20 to about 50 milliNewtons per meter; and inkjet printing an ink having an ink viscosity lower than the primer viscosity over the primer while the primer is wet, where the primer is present in a density of about 2 to about 6 g/m$^2$ of film as formed by the primer.

DETAILED DESCRIPTION OF A PREFERRED EMBODIMENT

In various embodiments, the invention enables ink jet ink to be printed on a non-absorbent substrate. The non-absorbent substrate is coated with a wet primer having a primer viscosity. An ink jet ink having an ink jet viscosity lower than the primer viscosity is jetted over the wet primer while the primer is still wet. The wet primer and inkjet ink coated surface are then cured.

Non-absorbent substrates for use in connection with the invention include substrates that are not capable of drawing in or absorbing the primer or ink into the substrate. Exemplary non-absorbent substrates can include, but are not limited to, metals, plastics, glass, and mirrors, for example. The non-absorbent substrates can have a roughened surface, whereby the primer or ink settles into a crater or pit on the surface but is still not be absorbed into the substrate. Non-absorbent substrates can also include substrates that traditionally have a higher porosity than those listed above, but that have otherwise been treated to reduce their porosity significantly, such as a paper substrate coated with a non-absorbent barrier layer.

In embodiments where the substrate is metallic, the metallic substrate can be selected from metals, metal alloys, and metal-containing substrates, such as metallized paper, metallized paper board, and metal/plastic composites. In various embodiments, the metal substrate can be made of, e.g. tin, aluminum, and/or stainless steel. The metal substrate, or any other substrate, can be cleaned to remove surface contamination from dirt, dust, oil, and the like as part of the surface preparation to provide a non-contaminated surface on which to apply the primer and the ink jet ink. These surface contaminants are common to metallic substrates and, if left untreated, can cause imperfections on the printed substrate.

In various embodiments, the metallic substrate can be provided in a sheet form that can be shaped after printing into a formed product. Exemplary formed products include, e.g. metal cans, signage, decorative labels or decals, and various automotive or computer components.

The primer or undercoat composition is deposited as a layer on a substrate by any suitable method that can apply a continuous layer to cover and wet the underlying substrate. A wet layer provides a liquid interface onto which the ink jet ink is printed and secured. The primer can be applied by such techniques as, e.g. roll coating, the use of a doctor blade, jetting, or by a flexographic technique. The primer layer is preferably even and has substantially the same thickness across the substrate. Preferably, there is less than a 5% variance in the thickness of the primer as measured across the substrate. Applying the even layer of primer, when combined with the primer characteristics detailed later herein, provides a simple and effective technique for inkjet printing on non-absorbent substrates.

The primer viscosity is preferably sufficiently high to prevent mobility of the primer with respect to the non-absorbent substrate and to make the primer soluble in the ink jet ink. In various embodiments, the primer can have a viscosity of from about 100 to about 300 centipoises, a viscosity of from about 200 to about 300 centipoises, or a viscosity of from about 140 to about 150 centipoises. The primer can be applied at a temperature of from about 20° C. to about 40° C., or at a temperature of 35° C. The viscosity of the primer may be controlled during the process. In various embodiments, the process is conducted such that the viscosity of the primer does not significantly decrease through the printing process. For example, the temperature may be controlled so as to not decrease primer viscosity by maintaining a temperature at or above the application temperature during the ink printing process. Accordingly, in such embodiments, the primer remains at the same or increased viscosity from the point of dispensing until after the final curing of the printed substrate.

The applied primer layer has a thickness sufficient to provide a smooth substrate. In various embodiments, the primer layer has a thickness of from about 1 to about 50 μm. For example, the primer may be applied in an amount sufficient to provide a film having a film weight of about 2 to 6 g/m² over the substrate.

Suitable primer compositions include curable overcoat varnishes well known in the industry, such as compositions containing curable epoxy resins. An exemplary, suitable primer composition is the coater varnish sold as ICIMAR™ MD UV 2020RS by ICI Packaging Coatings Ltd. of Sutton Fields, England. The primer compositions useful herein can be cured by a cationically-driven process or by a radically-driven process. In various embodiments, the primer compositions include cycloaliphatic epoxide resins or modified cycloaliphatic epoxide resins.

The primer composition used to form the primer coating layer can be substantially colorless or can include one or more colorants, such as dyes, pigments, and mixtures thereof. In various embodiments, the primer is clear and is preferably non-yellowing, particularly when exposed to actinic radiation during cure. In various other embodiments, the primer can have a light color. The light color can be useful, for example, over a dark colored substrate, such as certain metallic substrates. A white primer can be obtained, for example, by using titanium dioxide dispersed with a suitable dispersant in a UV Matrix. The number and kinds of any additional colorants depends upon the primer being formulated. The primer composition can comprise from about 2% to about 40% of colorant by weight of the composition.

For the primer composition to spread well on the substrate, the liquid state of the composition preferably has a relatively low surface energy or low surface tension, as compared to the substrate surface. A low surface energy, radiation curable fluid that is useful as the primer composition can be obtained by adding suitable low surface energy monomers. Examples of such monomers include, without limitation, isodecyl acrylate, with a surface tension of about 28.6 dynes/cm; alkoxylated nonylphenol acrylate, with a surface tension of about 28.5 dynes/cm; and propoxylated neopentyl glycol diacrylate, with a relatively low surface tension for a diacrylate of 32 dynes/cm. The primer can have a surface energy of from about 20 to about 50 milliNewtons per meter. In various embodiments, the primer can have a surface energy of about 20 to 25 milliNewtons per meter.

The primer compositions of the invention can also include suitable additives that enhance the wetting of the substrate, including surfactants, plasticizers, diluents, wetting agents, and leveling agents known to those skilled in the art. Examples include crosslinkable silicone acrylates, such as Tegorad 2100; a polydimethyl siloxane, such as Byk-333; or a leveling additive, such as Byk-381, available from Byk-Chemie.

After application of the primer, an ink jet ink is jetted onto the layer of primer. The ink jet ink solvates the primer. The primer partially immobilizes the ink jet drops on the substrate to facilitate adherence of the ink jet drops on the substrate. Further, the solvation of the primer by the ink prevents excessive mobility of the drops and coalescence of the drops near each other. The selective immobilization contains a drop in a specific area, generally the area upon which the drop was deposited. The selective immobilization allows the drop to spread from the deposition point but without distorting the image. The selective immobilization prevents run-off or ink defects that occur when using known ink jet printing techniques on non-absorbent surfaces.

The ink jet viscosity is preferably from about 5 to about 100 centipoises. The ink may be jetted at a temperature of from about 20° C. to about 70° C.

Typical ink jet ink formulations include monofunctional and polyfunctional monomers of acrylate and low viscosity vinyl materials. Examples of suitable monofunctional monomers include, without limitation, alkylenediol diacrylates, such as 1,6-hexanediol diacrylate and neopentylglycol diacrylate; cyclohexanedimethanol diacrylate, polyalkylene glycol di(meth)acrylates, such as triethylene glycol diacrylate; ether modified monomers, such as propoxylated neopentylglycol diacrylate; and higher functionality monomers, such as trimethylolpropane triacrylate, trimethylolethane triacrylate, and pentaerythritol tetracrylate, and so on, as well as combinations of such polyfunctional monomers. The polyfunctional monomers can include polyacrylates.

The ink also can include a reactive oligomer. Examples of suitable reactive oligomers include oligomers comprising an ethylenically unsaturated double bond, such as acrylated epoxy oligomers, acrylated polyurethane oligomers, acrylated polyester oligomers, and combinations of these. In various embodiments, reactive oligomers comprise more than one ethylenically unsaturated double bond.

In various embodiments, the ink can be formulated to provide flexibility and elasticity of the ink on the printed substrate. The increased flexibility and elasticity of the ink prevents cracking when the ink-coated substrate is formed, then placed in a water bath. In various embodiments, the ink can be formulated to provide a sufficient glass transition temperature and tensile strength of the cured ink film to allow the printed substrate to withstand a water bath temperature of less than 55° C. without exhibiting the cracking phenomenon. For example, the flexibility and elasticity can be provided by incorporating particular monomeric or oligomeric units in the ink formulation or through incorporation of chain transfer agents in the ink.

Suitable flexibility and elasticity enhancing monomeric units include, e.g. isobornyl acrylate (IBOA), sold by Sartomer Company, Inc. of Exton Pa., USA; stearyl acrylate; urethane acrylates; and polyester acrylates. In ink formulation embodiments containing isobornyl acrylate, the isobornyl acrylate component can comprise from about 25% to about 55% by weight of the ink formulation. In still further embodiments, the isobornyl acrylate component can comprise at least about 30% to 40% by weight of the ink formulation. Suitable diacrylates that can provide flexibility and elasticity include, e.g. propoxylated neopentyl glycol diacrylate, marketed as SR9003 by Sartomer Company, Inc. of Exton, Pa., USA. In various embodiments, the diacrylate can be present in the formulation at from about 10% to about 60% by weight. Other suitable monomeric or oligomeric materials include the low-viscosity acrylate monomer CD420 sold by Sartomer Company, Inc. of Exton, Pa., USA. The low viscosity monomer can be present in the ink formulation at from about 0% to about 20% by weight. In ink formulation embodiments containing isobornyl acrylate, the isobornyl acrylate component can comprise from about 25% to about 50% by weight of the ink formulation. In still further embodiments, the isobornyl acrylate component can comprise at least about 30% to 40% by weight of the ink formulation. Exemplary formulations for the flexible and elastic inks are provided in the Examples herein.

The flexibility and elasticity of the ink can also be enhanced when shorter monomeric units or lower molecular weight chains are employed through the chain transfer agent. Various mercaptans are useful as chain transfer agents in embodiments of the invention and prevent the cracking phenomenon of the inks when the inks are subjected to the water bath.

The pigment or pigments in the ink jet ink can be any of those suitable for ink jet inks. In general, pigments for ink jet inks have a maximum particle size that is small enough to avoid clogging the ink jets during printing. The pigments preferably have a narrow particle size distribution. Among these are C.I. Pigment Yellow 93, 95, 109, 110, 120, 128, 138, 139, 151, 154, 155, 173, 180, 185 and 193; C.I. Pigment Orange 34, 36, 43, 61, 63 and 71; C.I. Pigment Red 122, 202, 254, and a solid solution of C.I. Pigment Red 122 and 202; C.I. Pigment Blue 15:3 and 15:4; C.I. Pigment Violet 19, 23 and 33; and C.I. Pigment Black 7. The ink jet inks are preferably used in a set that provides for full-color printing of images. In one preferred embodiment, an ink set including cyan, magenta, yellow, and black (CMYK) inks is used. For example, yellow, C.I. Pigment Yellow 138, 151, 154, 180, and 185 can be used in the yellow ink; C.I. Pigment Red 122 and 202, 254, and C.I. Pigment Violet 19 can be used in the magenta ink; C.I. Pigment Blue 15 can be used in the cyan ink; and an acidic or neutral pigment of C.I. Pigment Black 7 can be used in the black ink.

The amount of pigment included in the ink depends upon, for example, which pigment is used. In general, the ink jet ink contains from about 0.5 to about 30% by weight of pigment. While a sufficient amount of pigment is included to attain the desired color density of the ink, including more pigment also tends to increase viscosity. Suitable pigments are available, for example and without limitation, from Clariant Corporation of Coventry, R.I. and Ciba Specialty Chemicals Corp. of Basel, Switzerland. In some embodiments, other ink jet ink additives can be added, including, but not limited to up to approximately 10% solvent.

The ink jet ink is printed over the primer coating. The ink jet ink can be printed using drop-on-demand (DOD) inkjet printer. The ink jet ink can printed in particular using piezo-driven DOD heads (modules) where the ink is ejected in accordance with a digitally driven image by flexing of a piezoelectric crystal in the print head. The printing module typically has a large number of nozzles, and the printer is made up of an aligned group of modules. An example of a piezo-driven printing module is the SL-128 print head from Spectra that jets a nominal 80 picoliter drop.

After the ink is printed onto the primed substrate, the primer and the ink jet ink are simultaneously cured and hardened by exposure to actinic radiation, thermal energy, or both actinic radiation and thermal energy. Actinic radiation includes electromagnetic radiation, such as visible light, UV radiation or X-rays, and corpuscular radiation, such as electron beams.

If cured by UV light, the primer and ink jet ink compositions typically comprise at least one photoinitiator, or photoinitiator package. If present, the photoinitiator package typically comprises from about 2 to about 20% of the total binder, i.e. reactive materials, by weight. Non-limiting examples of photoinitiators include alphahydroxy ketones, such as 1-hydroxy-cyclohexyl-phenyl-ketone; alpha aminoketones, such as 2-benzyl-2-(ditnethylamino)-1-(4-morpholinyl)phenyl)-1-butanone; acyl phosphines, such as Diphenyl(2,4,6-tritn-ethylbenzoyl)phosphine oxide; benzophenone derivatives; thioxanthones, such as isopropylthioxanthone (ITX); and amine coinitiators, such as ethyl-p-dimethyl amino benzoate. If cured by e-beam technology, no photoinitiator package is required for an acrylate based ink or primer.

A cationically cured ink can contain epoxide-functional vinyl ethers, such as triethylene glycol divinylether and/or aliphatic epoxies, such as the cycloaliphatic epoxide UVR-6105, commercially available from Dow Chemical in Midland, Mich.; a colorant and additives, as described above; and a photoinitiator package that contains arylsulfonium salts, such as Cyracure UVI-6992, or arylsulfonium hexafluoroantitnonate salts, such as Cyracure UVI-6976, also both commercially from Dow Chemical.

The thermal curing does not generally have special features as to its method but, instead, takes place in accordance with the customary and known methods, such as heating in a convection oven or irradiation with IR lamps. A peroxide or azo initiator may be added.

In certain preferred embodiments, the primer and ink are cured with actinic radiation. Curing with actinic radiation is carried out using customary and known radiation sources and optical auxiliary measures. Non-limiting examples of suitable radiation sources include high-pressure or low-pressure mercury vapor lamps, with or without doping, or electron beam sources. Their arrangement is known in principle and can be adapted to the circumstances of the work piece, i.e. the substrate to be printed, and the process parameters.

Curing can take place in stages, i.e. by multiple exposures to light or actinic radiation. It can also take place by alternate exposures to UV radiation and electron beams. Where thermal curing and curing with actinic radiation are employed together, these methods can be used simultaneously or in alternation. Where the two curing methods are used alternatively, it is possible, for example, to commence with the thermal curing and to end with the curing with actinic radiation, or vice versa.

Various post processing steps can be performed on the printed substrate. For example, it may be desirable to coat the cured substrate with a protective varnish topcoat. Suitable varnishes and protective top coats are known in the art and can be selected based on the type of substrate and the desired end finish of the product. In various embodiments, the protective top coat can be of the same formulation as the primer layer.

EXAMPLES

Example 1

Ink Formulation

Ink formulations useful herein are made having the composition shown in Table 1 below. Specific materials are exemplary of classes of materials having similar functional characteristics within the composition.

TABLE 1

Ink Formulation

| Material name | Percentage by weight |
|---|---|
| Propoxylated neopentyl glycoldiacrylate SR9003 (Sartomer Company, Inc.) | 10 to 60% |
| Isobornyl Acrylate(Sartomer Company, Inc.) | 20 to 55% |
| CD 420 (Sartomer Company, Inc.) | 0 to 20% |
| Photoinitiator | 2 to 20% |
| Pigment Base | 2 to 30% |

The ink formulations are highly compatible with the ICIMAR™ MD UV 2020RS coater varnish, sold by ICI Packaging Coatings Ltd. of Sutton Fields, England. The combination of the ink formulation and the 2020RS coater varnish provides improved printing quality on metal substrates.

Example 2

Black Ink Formulation

In various embodiments, black ink formulations are made within the compositional ranges, including formulations that, for example, have specific mid-point levels for each individual component, and combinations thereof, as shown in Table 2 below.

TABLE 2

Black Ink Formulation

| Material name | Percentage by weight |
|---|---|
| Propoxylated neopentyl glycol diacrylate | 15 to 20% |
| SR9003 (Sartomer Company, Inc.) Isobornyl Acrylate (Sartomer Company, Inc.) | 45 to 55% |
| CD 420 (Sartomer Company, Inc.) | 8 to 15% |
| Photoinitiator (Genocure L ™ by Rahn USA of Aurora, Illinois) | 2 to 10% |
| Photoinitiator (Esacure One by Lamberti Sp. A. of Gallarate, Italy) | 2 to 10% |
| Black Base | 5 to 10% |

The black ink formulation has a surface tension of 30.6 dynes/cm2. The black ink formulation has a viscosity of 12.5 centipoises at 25° C. and a viscosity of 6.49 centipoises at 45° C.

The black ink formulation is highly compatible with the ICIMAR™ MD UV 2020RS coater varnish sold by ICI Packaging Coatings Ltd. of Sutton Fields, England. The combination of the black ink formulation and the 2020RS coater varnish provides improved printing quality on metal substrates.

Example 3

Cyan Ink Formulation

Similarly, inkjet formulations are made within the compositional ranges shown in Table 3, below.

TABLE 3

Cyan Ink Formulation

| Material Name | Percentage by weight |
|---|---|
| Propoxylated neopentyl glycol diacrylate | 30 to 40% |
| SR9003 (Sartomer Company, Inc.) Isobornyl Acrylate (Sartomer Company, Inc.) | 45 to 55% |

TABLE 3-continued

Cyan Ink Formulation

| Material Name | Percentage by weight |
|---|---|
| Photoinitiator (Genocure LTM by Rahn USA of Aurora, Illinois) | 2 to 10% |
| Photoinitiator (Esacure TZT by Lamberti Sp. A. of Gallarate, Italy) | 2 to 10% |
| Cyan Base | 5 to 10% |

The cyan ink formulation has a surface tension of 31 dynes/cm2. The cyan ink formulation has a viscosity of 10.8 centipoises at 25° C. and a viscosity of 5.65 centipoises at 45° C.

The cyan ink formulation is highly compatible with the ICIMAR™ MD UV 2020RS coater varnish, sold by ICI Packaging Coatings Ltd. of Sutton Fields, England. The combination of the cyan ink formulation and the 2020RS coater varnish provides improved printing quality on metal substrates.

Example 4

Magenta Ink Formula

Similarly, inkjet ink formulations are made within the compositional ranges show in Table 4 below.

TABLE 4

Magenta Ink Formula Material

| Name | Percentage by Weight |
|---|---|
| Propoxylated neopentyl glycol diacrylate | 15 to 30% |
| SR9003 (Sartomer Company, Inc.) Isobornyl Acrylate (Sartomer Company, Inc.) | 45 to 55% |
| Photoinitiator (Genocure LTM by Rahn USA of Aurora, Illinois) | 2 to 10% |
| Photoinitiator (Esacure TZT by Lamberti Sp. A. of Gallarate, Italy) | 2 to 10% |
| Magenta Base | 12 to 25% |

The magenta ink formulation has a surface tension of 30.9 dynes/cm2. The magenta ink formulation has a viscosity of 15.4 centipoises at 25° C. and a viscosity of 8.14 centipoises at 45° C.

The magenta ink formulation is highly compatible with the ICIMAR™ MD UV 2020RS coater varnish, sold by ICI Packaging Coatings Ltd. of Sutton Fields, England. The combination of the magenta ink formulation and the 2020RS coater varnish provides improved printing quality on metal substrates.

Example 5

Yellow Ink Formula

Similarly, inkjet ink formulations are made within the compositional ranges shown in Table 5 below.

TABLE 5

Yellow Ink Formula

| Material Name | Percentage by Weight |
|---|---|
| Isobornyl Acrylate (Sartomer Company, Inc.) | 40 to 50% |
| Propoxylated neopentyl glycol diacrylate | 8 to 20% |

TABLE 5-continued

Yellow Ink Formula

| Material Name | Percentage by Weight |
|---|---|
| SR9003 (Sartomer Company, Inc.) CD 420 (Sartomer Company, Inc.) | 5 to 15% |
| Photoinitiator (Genocure LTM by Rahn USA of Aurora, Illinois) | 2 to 10% |
| Photoinitiator (Esacure TZT by Lamberti Sp. A. of Gallarate, Italy) | 2 to 10% |
| Transparent Yellow Base | 10 to 25% |

The yellow ink formulation has a surface tension of 30.5 dynes/cm2. The yellow ink formulation has a viscosity of 12.1 centipoises at 25° C. and a viscosity of 6.57 centipoises at 45° C.

The yellow ink formulation is highly compatible with the ICIMAR™ MD UV 2020RS coater varnish, sold by ICI Packaging Coatings Ltd. of Sutton Fields, England. The combination of the yellow ink formulation and the 2020RS coater varnish provides improved printing quality on metal substrates.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method of ink jet printing onto a metallic substrate, comprising the steps of:
    applying a primer having a primer viscosity of from about 100 to about 300 centipoises onto the metallic substrate, wherein the primer has a surface energy of from about 20 to about 50 milliNewtons per meter;
    ink jet printing an ink having an ink viscosity greater than the viscosity of the primer over the primer while the primer is wet;
    wherein the primer has a film weight of about 2 to about 6 $g/m^2$ of an ink film as formed by the primer and the ink jet ink; and
    simultaneously curing the primer and the ink jet ink on the substrate.

2. The method of claim 1, wherein the primer has a surface energy of about 20 to about 25 milliNewtons per meter.

3. The method of claim 1, further comprising the step of: applying the primer at a temperature of from about 20 degree C. to about 40 degree C.

4. The method of claim 1, wherein the metallic substrate is selected from the group consisting of metals, metal alloys, and metal-containing substrates.

5. The method of claim 1, wherein the metallic substrate comprises a sheet metal.

6. The method of claim 1, further comprising the step of: applying an overcoat to the primer and ink jet on the sheet metal.

7. The method of claim 1, wherein the overcoat and the primer are of the same chemical formulation.

8. The method of claim 7, further comprising the step of: shaping the printed sheet metal into a formed product.

9. The method of claim 1, wherein the primer and the ink jet ink are actinic radiation curable; and
    further comprising the step of curing the primer and the ink jet ink with actinic radiation.

* * * * *